(12) United States Patent  
Cifers

(10) Patent No.: US 8,783,975 B1
(45) Date of Patent: Jul. 22, 2014

(54) MONOPOD TURRET SUPPORT

(71) Applicant: Luther Cifers, Amelia, VA (US)

(72) Inventor: Luther Cifers, Amelia, VA (US)

( * ) Notice: Subject to any disclaimer, the term of this patent is extended or adjusted under 35 U.S.C. 154(b) by 0 days.

(21) Appl. No.: 13/897,916

(22) Filed: May 20, 2013

Related U.S. Application Data

(60) Provisional application No. 61/650,132, filed on May 22, 2012.

(51) Int. Cl.
*G03B 17/00* (2006.01)

(52) U.S. Cl.
USPC ................................................ 396/428

(58) Field of Classification Search
CPC ..................................... F16M 11/28
USPC .......................................... 396/428
See application file for complete search history.

(56) References Cited

U.S. PATENT DOCUMENTS

| | | | | |
|---|---|---|---|---|
| 2,771,826 A | * | 11/1956 | Shapiro | 224/257 |
| 3,864,048 A | * | 2/1975 | Parker | 403/27 |
| 7,905,667 B2 | * | 3/2011 | Barker | 396/419 |
| 8,020,828 B2 | * | 9/2011 | Carnevali | 248/412 |
| 2005/0161561 A1 | * | 7/2005 | Hsieh | 248/171 |
| 2008/0011344 A1 | * | 1/2008 | Barker | 135/66 |
| 2008/0138152 A1 | * | 6/2008 | Carnevali | 403/376 |
| 2009/0084912 A1 | * | 4/2009 | Speggiorin | 248/176.3 |
| 2009/0136290 A1 | * | 5/2009 | Persson | 403/125 |
| 2013/0134284 A1 | * | 5/2013 | Hu et al. | 248/451 |
| 2013/0193281 A1 | * | 8/2013 | Hennessey | 248/121 |

* cited by examiner

*Primary Examiner* — Rodney Fuller
(74) *Attorney, Agent, or Firm* — Thedford I. Hitaffer; Hitaffer & Hitaffer, PLLC

(57) ABSTRACT

A monopod turret type support for a camera or the like comprises an upper shaft aligned along a common axis with a lower shaft, and a pivot joint located between and uniting the upper shaft and lower shaft. The pivot joint may comprise a screw disposed to vary pressure acting on the interface between the upper shaft and the lower shaft. Pressure acting on the interface may be adjusted by inserting a pin to lock the screw to one of the upper and lower shafts, and rotating the upper shaft relative to the lower shaft. The upper shaft may terminate in a threaded attachment for threading to the camera. The lower shaft may terminate in a threaded adapter to enable threading to a threaded shaft of an environmental object.

11 Claims, 3 Drawing Sheets

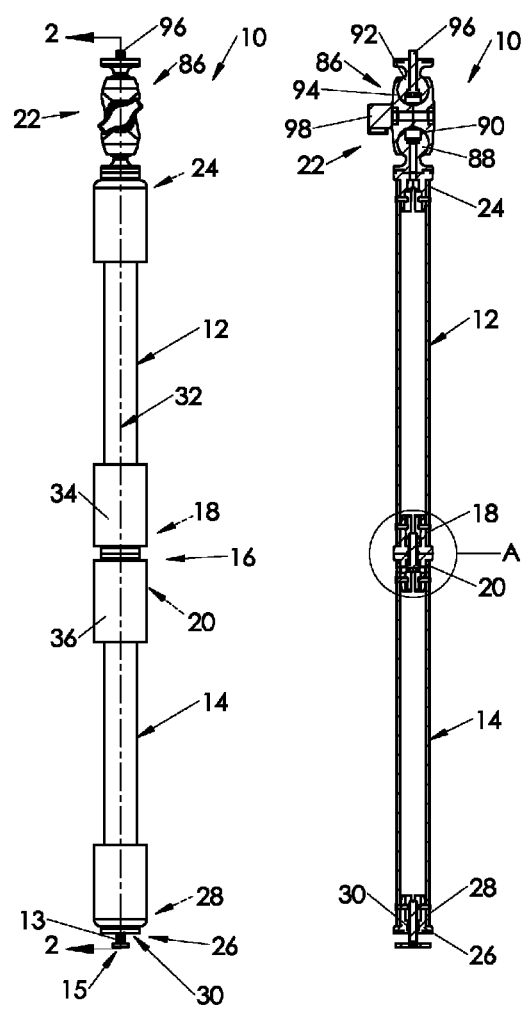
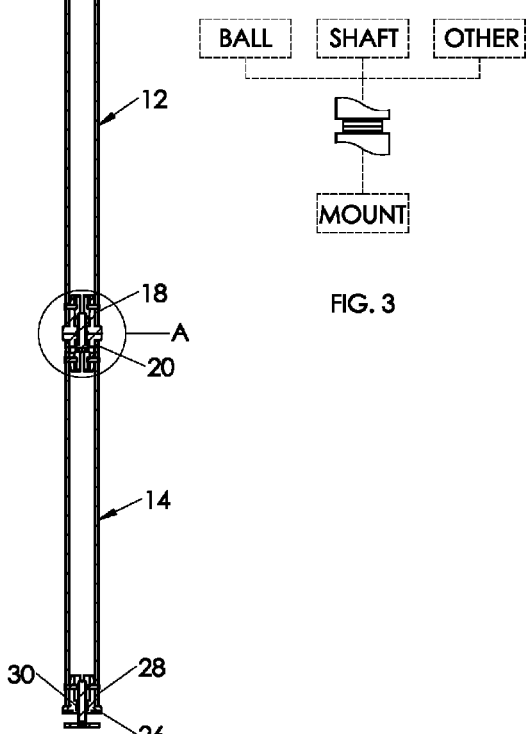
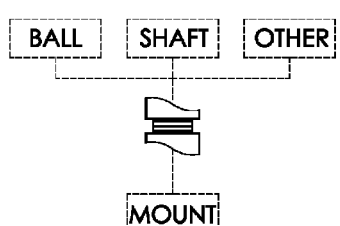
FIG. 1
FIG. 2
FIG. 3

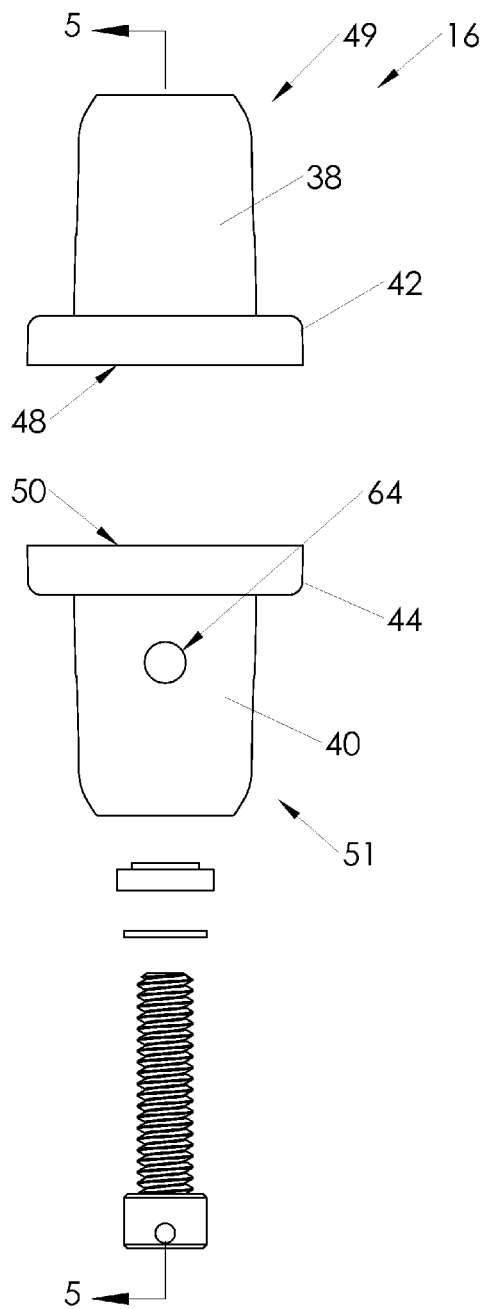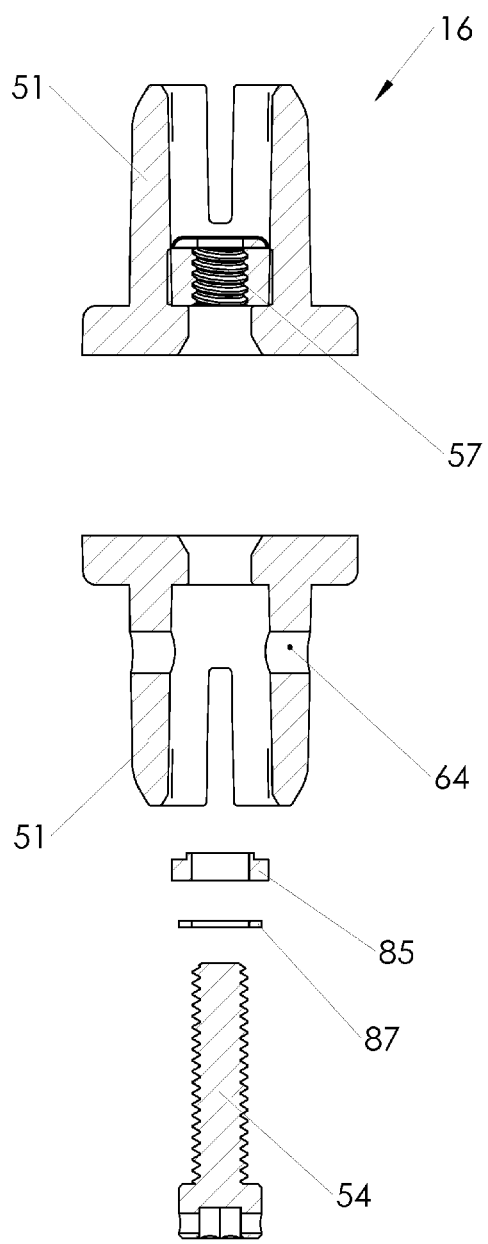
FIG. 4
FIG. 5

MONOPOD TURRET SUPPORT

CROSS-REFERENCE TO RELATED APPLICATIONS

This application claims the benefit of U.S. Provisional Application No. 61/650,132, filed May 22, 2012, the disclosure of which is incorporated herein by reference.

BACKGROUND OF THE INVENTION

This invention relates in general to supports, and more particularly, to a device that may be fixed to an environment at one end, and enables rotation of a supported object independently of the fixed end.

Devices such as cameras frequently require being held in a fixed position or in a fixed plane to permit fully advantageous effectiveness. For one thing, it is frequently desirable to hold the camera still so that minor movements and vibration do not result in blurred images. At the same time, it is frequently desirable to adjust the azimuth of the lens so that desired subject matter is fully captured in the resulting image.

Cameras have long been held by hand. While some subject matter is susceptible to hand holding, other subject matter requires steadier support. Tripods have long been used to satisfy this need. However, successful use of a tripod may require that the supporting environmental surface be penetratable by the legs of the tripod, or that the plane of the supporting environmental surface be arranged at a particular orientation, such as horizontal.

Another aspect to camera support is the ability to provide and also to control rotation of the support of a device, such as a tripod. As mentioned above, it is frequently desirable to adjust the azimuth of a camera. Yet the ability to provide such adjustment may introduce lack of control over spontaneous rotation of the camera support platform.

There remains a need for a support that provides the essential functions of a tripod, yet improves on control over rotation of the camera support platform and also overcomes limitations imposed by reliance on for example the three legs of a tripod.

SUMMARY OF THE INVENTION

The present invention relates to a monopod turret support that provides rotatable support to devices, such as cameras. The monopod support incorporates a pivot that affords control over resistance to pivot.

The monopod turret support comprises an upper tube, a lower tube, and a pivot joint disposed between the upper tube and the lower tube. Under ordinary conditions, mutual rotation between the upper tube and the lower tube results in rubbing contact at an interface within the pivot joint. A pin may be inserted into the pivot joint so as to lock the upper tube and its associated components within the pivot joint to the lower tube and those components associated with the lower tube. Once the upper and lower tubes are locked, mutual rotation that would ordinarily cause the upper and lower tubes to rotate mutually will instead drive a nut internal to the pivot joint to adjust friction acting on the interface. The result is that once the pin is removed, tensional forces required to rotate the upper tube relative to the lower tube will have been increased or decreased.

This adjustment allows a user to strike a desired balance between opposing inadvertent mutual rotation of the upper and lower tubes, and on the other hand, to facilitate such rotation.

The upper tube may be terminated by a device intended to engage and retain a camera or other supported object. The lower tube may be terminated by an apparatus for fastening to, or otherwise engaging, a supporting environmental surface or object.

A camera or other object may thus be held to the monopod turret support, which monopod turret support may be installed to, or otherwise supported on, or engage an environmental surface or object. The camera may be rotated about the longitudinal axis of the monopod turret to any desired azimuth. The amount of force may be adjusted to suit the desires of the person using the camera.

Various advantages of this invention will become apparent to those skilled in the art from the following detailed description of the preferred embodiment, when read in light of the accompanying drawings.

BRIEF DESCRIPTION OF THE DRAWINGS

FIG. 1 is an elevational view of a monopod turret support.

FIG. 2 is a cross sectional view of taken along the line 2-2 in FIG. 1, with some external components not shown for clarity.

FIG. 3 is a diagrammatic representation of alternate configurations of the support.

FIG. 4 is an exploded elevational detail view of a component partially revealed at the center of FIG. 1, drawn to enlarged scale.

FIG. 5 is a cross sectional view taken along the line 5-5 in FIG. 4.

DETAILED DESCRIPTION OF THE PREFERRED EMBODIMENT

Figure 6:
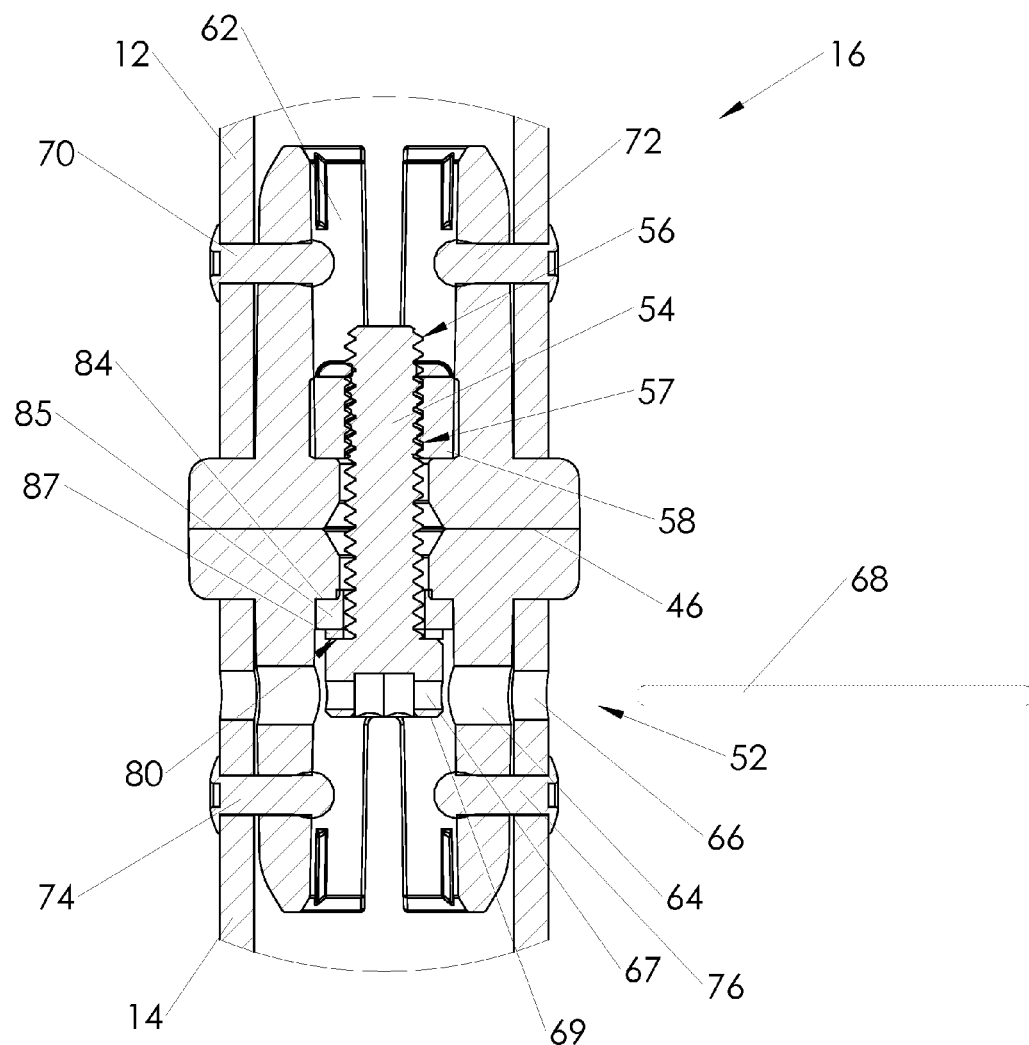
FIG. 6 is an enlarged cross sectional view of components in detail A in FIG. 2.

Referring now to the drawings, there is illustrated in FIGS. 1 and 2 a monopod turret support 10 for rotatably engaging an object, such as a camera (not shown), to a supporting environmental surface (not shown). The supporting environmental surface may be part of a vehicle, such as a boat or kayak, for example. Relatively large components of the monopod turret support 10 may comprise a hollow upper shaft 12, a hollow lower shaft 14, and an adjustable pivot joint 16 disposed between and pivotally connecting the lower end 18 of the upper shaft 12 to the upper end 20 of the lower shaft 14. An apparatus 22 for engaging the object to be engaged and supported is seen to be mounted to the upper end 24 of the upper shaft 12. An adapter 26 may be coupled to the lower end 28 of the lower shaft 14. The adapter 26 may include a threaded hole 30. The purpose of the adapter 26 is to enable the lower shaft 14 to be fixed to a threaded stud 13 of a tee bolt 15 or other structure that may cooperate with a component of the supporting environmental element, which may include a tee groove in a track supported in relation to the environmental object. This enables the monopod turret support 10 to be securely mounted to an environmental object such as a boat. Alternatively, other forms of the adapter may be employed to cooperate with other forms of attachment to the environment, which may not require the use of a tee bolt.

Both the apparatus 22 and the adapter 26 may be formed as components separate from and removable from their respective upper shaft 12 and lower shaft 14.

It may be mentioned at this point that orientation terms such as "upper" and "lower" refer to their subject matter as depicted in the drawings in positions of use under ordinary conditions. These orientation terms are intended as semantic conveniences and not as a necessary condition of the monopod turret support 10, as obviously, the monopod turret support 10 may be utilized in any desired position or orientation.

The upper shaft 12 and the lower shaft 14 may have a common longitudinal axis 32. It will be understood that the longitudinal axis 32 may refer to the axis of only the upper shaft 12, only the lower shaft 14, or the entire monopod turret support 10, depending upon context.

The lower end 18 of the upper shaft 12 and the upper end 20 of the lower shaft 14 may each be covered with a foam tube 34, 36, which increases buoyancy of the monopod support turret 10 and provides improved grip.

It should also be appreciated that the monopod turret support 10 is not intended to be limited in any way to members shown and described herein. For example, the support 10 is not intended to be limited to the upper shaft 12 and the lower shaft 14, or the apparatus 22 and the adapter 26, described above. Other members may be used in place of any one or more of these members, including a ball (see in FIG. 3), a socket, a camera quick-release (neither of which are shown), other members.

Turning momentarily to FIG. 4, the adjustable pivot joint 16 is seen to comprise an upper protrusion 38 that may be slipped into the lower end 18 of the upper shaft 12, a lower protrusion 40 that may be slipped into the upper end 20 of the lower shaft 14, an upper flange 42 that is fixed to the upper protrusion 38, and a lower flange 44 that is fixed to the lower protrusion 40. A joint 46 seen in FIG. 6 only as a line separating the upper flange 42 from the lower flange 44 serves as an interface between the two mutually rotatable components of the monopod turret support 10. The mutually rotatable components include on one hand, the upper shaft 12 and the apparatus 22, and on the other hand, the lower shaft 14 and the adapter 26. Also, the pivot joint 16 is subdivided into components ultimately fixed to the upper shaft 12 and the lower shaft 14. As employed herein, the term "ultimately fixed to" signifies that the described components may be directly coupled to one another, or alternatively, there may be intervening components that separate the components that are ultimately fixed to one another but do not interfere with effective monolithic nature of these separated components.

Referring particularly now to FIG. 4, the workings of the adjustable pivot joint 16 that is disposed between and pivotally connects the lower end 18 of the upper shaft 12 to the upper end 20 of the lower shaft 14 to enable the upper shaft 12 to pivot about the longitudinal axis 32 relative to the lower shaft 14 will be described. The adjustable pivot joint 16 comprises a first friction surface 48 that is ultimately fixed to the upper shaft 12, and a corresponding second friction surface 50 that is ultimately fixed to the lower shaft 14. The first friction surface 48 and the second friction surface 50 are disposed in mutual abutment and collectively define the interface 46 between the upper shaft 12 and the lower shaft 14.

The adjustable pivot joint 16 is formed as a first connector 49 and a separate second connector 51. The first connector 49 may comprise the upper protrusion 38 and the flange 42 that is unitary with the upper protrusion 38. The first friction surface 48 is the lowermost surface of the flange 42. The second connector 51 may comprise the flange 44 that is unitary with the lower protrusion 40. The second friction surface 50 is the uppermost surface of the flange 44.

Looking now at FIG. 6, a torsion adjuster 52 is disposed to adjust clamping force urging the first friction surface 48 against the second friction surface 50 at the interface 46. Adjustment of clamping force adjusts the amount of tensional force required to rotate the upper shaft 12 relative to the lower shaft 14 about the longitudinal axis 32. This force is manual force. Increasing the amount of resistance to free rotation by increasing clamping force opposes unintended or inadvertent rotation of the upper shaft 12 when the lower shaft 14 is fixed to an environmental object, hence stabilizing the camera or other supported object.

The torsion adjuster 52 may comprise a screw 54 bearing screw threads 56 and having a longitudinal axis (not specifically called out by reference numeral) that is parallel to the longitudinal axis 32, and female threads 57 that may be features of a nut 58, that are matingly compatible with the threads 56 of the screw 54. The female threads 57 and the screw 54 collectively serve as a clamp that adjustably imposes the clamping force urging the first friction surface 48 against the second friction surface 50.

Ordinarily, when the monopod turret support 10 is in use and the adjustable pivot joint is as seen at the left of FIG. 6, rotation of the upper shaft 12 relative to the lower shaft 14 would cause the screw 54 and the female threads 57 to rotate in tandem with the upper shaft 12, and would not affect the clamping force. The nut 58 may be carried within a passageway 62 that is shaped to conform to the outer surface of the nut 58 and that receives the nut 58 in close cooperation therewith. For example, the nut 58 may have a conventional hexagonal outer surface, with the opening 62 being similarly hexagonal. Alternatively, the nut 58 may be pressed with some force (e.g., a high force) into the opening 62, which may be round in shape. This fixes the nut 58 with respect to the first connector 49. In another alternative, the nut would have an outer surface with knurls or other geometry that, when formed together with the first connector 49, would fix it therein. In yet another alternative, the female threads 57 may be formed directly into the first connector 49. In this case, no nut may be required.

The clamping force may be adjusted in the following way. First, the upper shaft 12 and the lower shaft 14 are rotated until a hole 64 formed in the second connector 51 comes into axial alignment with a hole 66 formed in the lower shaft 14. The holes 64 and 66 extend fully through second section 51 and the lower tube 14 respectively. Next, with the cover tube 36 (not shown in FIG. 6) retracted by manually sliding the same along the longitudinal axis 32 to provide access to the holes 64, 66, a pin 68 is inserted into the holes 64, 66. The pin 68 passes through a hole 67 formed in the enlarged head 69 of the screw 54 and into opposed sides of second section 51 and the lower shaft 14. Because the first connector 49 of the adjustable pivot joint 16 is fixed to the upper shaft 12 by rivets 70, 72, for example, with the second section 51 similarly being fixed to the lower shaft 14 by rivets 74, 76, for example, the pin 68 effectively locks the screw 54 to the lower shaft 14.

Preferably but not necessarily, the holes 64, 66, and 67 that accept insertion of the pin 68 are perpendicular to the longitudinal axis 32.

Rotation of the upper shaft 12 relative to the lower shaft 14 now causes the screw 54 to rotate in tandem with the lower shaft 14. Because the female threads 57 are fixed to the first connector 49, the first connector 49 moves axially along the longitudinal axis 32 responsively to mutual rotation between the upper shaft 12 and the lower shaft 14.

Even minute axial travel by the first connector 49 adjusts clamping force exerted between the first friction surface 48 and second friction surface 50.

It should be mentioned here that the hole 66 must have a diameter dimension that is greater than the diameter of the pin 68, for enabling rotation of the pin 68 throughout a predetermined range of rotation of the upper shaft 12 relative to the lower shaft 14 when adjusting clamping force. The hole 66 could, for example, define an elongated slot (not shown), wherein the length occupies a plane that is perpendicular to the longitudinal axis 32.

The upper surface 80 of the head 69 of the screw 54 ultimately bears on a shoulder 84 formed in the second connector 51 of the adjustable pivot joint 16. The upper surface 80 of the head 69 of the screw 54 may be separated from the shoulder 84 by a shoulder washer 85 and a fiber washer 87. Depending upon the direction of mutual rotation of the upper shaft 12 and the lower shaft 14, clamping force drawing the first connector 49 against the second connector 51 of the adjustable pivot joint 16 is varied. Consequently, adjustment is made in frictional resistance to mutual rotation between the first connector 49 and the second connector 51. After adjustment is deemed satisfactory, the pin 68 may be extracted and the cover tube 36 may be returned to its ordinary position as depicted in FIG. 1. In summary, the pin 68 serves as a lock element disposed selectively to lock the screw 54 ultimately to the upper shaft 12 to enable the screw 54 to drive the female threads 57 along the longitudinal axis 32 of the screw 54, thereby adjusting clamping force when the upper shaft 12 is rotated relative to the lower shaft 14.

It will be appreciated that clamping forces exerted by the female threads 57 and screw 54 also collectively unite the first connector 49 and the second connector 51 of the adjustable pivot joint 16, thereby ultimately clamping the upper shaft 12 to the lower shaft 14 so that the monopod turret support 10 remains as a unitary device while still enabling mutual rotation between the upper shaft 12 and the lower shaft 14.

Referring again to FIGS. 1 and 2, the apparatus 22 may comprise a double split ball socket assembly 86, including a first ball 88 to be received within a first split ball socket 90, and a second ball 92 to be received within a second split ball socket 94. The term "split" signifies that the first split ball socket 90 and the second split ball socket 94 are cleft so as to be able to spread apart to slightly vary the internal volumes thereof. The ball socket assembly 86 may be formed with the cleft fully dividing the ball socket assembly 86 into two parts. Alternatively, the cleft may not fully divide the ball socket assembly literally into two separable parts. It is merely necessary to be able to close the first split ball socket 90 over the first ball 88 and to close the second split ball socket 94 over the second ball 92. A clamp screw 98 may thread into the ball socket assembly 86 to clamp the ball socket assembly 86 into the closed condition.

The ball socket assembly 86 may terminate in an upwardly projecting threaded shaft 96 for threading the object to be engaged and supported. Illustratively, many cameras (not shown) have a threaded port for accommodating such a support arrangement. The clamp screw 98 when tightened may immobilize the screw 96 at a selected orientation to the longitudinal axis 32.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A monopod turret support for rotatably engaging an object relative to a supporting environmental surface, comprising:

an upper member having an upper end, an apparatus for engaging the object disposed at the upper end, a lower end, and a longitudinal axis;

a lower member having an upper end, a lower end, and a longitudinal axis;

an adjustable pivot joint disposed between and pivotally connecting the lower end of the upper member to the upper end of the lower member to enable the upper member to pivot about the longitudinal axis of the upper member relative to the longitudinal axis of the lower member, wherein the adjustable pivot joint comprises a first friction surface ultimately fixed to the upper member, and a second friction surface ultimately fixed to the lower member and disposed in abutment with the first friction surface to define an interface between the upper member and the lower member, and a torsion adjuster disposed to adjust clamping force urging the first friction surface against the second friction surface at the interface, and thus adjusting the amount of tensional force required to rotate the upper member relative to the lower member about the longitudinal axis, wherein the torsion adjuster comprises a screw bearing threads and having a longitudinal axis parallel to the longitudinal axes of the upper member and of the lower member, and a nut that has threads matingly compatible with the threads of the screw, wherein the nut and the screw serve as a clamp that adjustably imposes the clamping force urging the first friction surface against the second friction surface, and a lock element disposed selectively to lock the screw ultimately to one of the upper member and the lower member to enable the screw to drive the nut along the longitudinal axis of the screw, thereby adjusting clamping force when the upper member is rotated relative to the lower member.

2. The monopod turret support of claim 1, wherein the screw and the nut collectively ultimately clamp the upper member to the lower member while enabling mutual rotation therebetween.

3. The monopod turret support of claim 1, wherein the lock element comprises a pin that is insertable through the screw and a selected one of the upper member and the lower member, and the screw has a hole formed therethrough perpendicularly to the longitudinal axis of the screw for accepting insertion of the pin, and the selected one of the upper member and the lower member has a hole formed therein and extending perpendicularly to the longitudinal axis of the selected one of the upper member and the lower member, for accepting insertion of the pin, wherein the pin extends entirely through the screw and into opposed sides of the selected one of the upper member and the lower member when the pin is inserted into the hole of the screw, and the hole of the selected one of the upper member and the lower member has a dimension that is greater than the diameter of the pin, for enabling rotation of the pin throughout a predetermined range of rotation of the upper member relative to the lower member when adjusting clamping force.

4. The monopod turret support of claim 3, wherein the screw has an enlarged head, and the hole of the screw extends through the enlarged head.

5. The monopod turret support of claim 1, wherein the apparatus for engaging the object being engaged comprises a threaded shaft.

6. The monopod turret support of claim 5, wherein the apparatus for engaging the object being engaged comprises a split ball socket and a ball received in the split ball socket, and having a clamp disposed to close the split ball socket over the ball to immobilize the screw at a selected orientation to the longitudinal axis of the upper member.

7. The monopod turret support of claim 5, wherein the apparatus for engaging the object being engaged comprises a double split ball socket assembly including a first ball and a first split ball socket, and a second ball and a second split ball socket, and wherein the clamp is disposed to close the first split ball socket over the first ball and the second split ball socket over the second ball.

8. The monopod turret support of claim 5, wherein the apparatus for engaging the object being engaged is formed as a component that is separate from and removable from the upper member.

9. The monopod turret support of claim 1, wherein the end of the lower member comprises an adapter including a threaded hole, whereby the lower member may be fixed to a threaded shaft that is matingly compatible with the threaded hole.

10. The monopod turret support of claim 9, wherein the adapter is formed as a component that is separate from and removable from the lower member.

11. The monopod turret support of claim 1, wherein the upper member is a shaft and the lower member is a shaft.

* * * * *